United States Patent
Rossi et al.

(10) Patent No.: US 11,643,059 B2
(45) Date of Patent: May 9, 2023

(54) METHOD FOR CONTROLLING A BRAKING ACTION APPLICABLE BY A BRAKE CALIPER ON A MECHANICAL MOVEMENT MEMBER OF A VEHICLE AND SYSTEM THEREOF

(71) Applicant: FRENI BREMBO S.P.A., Curno (IT)

(72) Inventors: Alessandro Rossi, Curno (IT); Luca Ugolini, Curno (IT); Fabrizio Forni, Curno (IT); Davide Paolini, Curno (IT)

(73) Assignee: Brembo S.p.A., Curno (IT)

( * ) Notice: Subject to any disclaimer, the term of this patent is extended or adjusted under 35 U.S.C. 154(b) by 986 days.

(21) Appl. No.: 16/474,085

(22) PCT Filed: Dec. 27, 2017

(86) PCT No.: PCT/IB2017/058432
§ 371 (c)(1),
(2) Date: Jun. 27, 2019

(87) PCT Pub. No.: WO2018/122741
PCT Pub. Date: Jul. 5, 2018

(65) Prior Publication Data
US 2020/0122695 A1    Apr. 23, 2020

(30) Foreign Application Priority Data

Dec. 29, 2016   (IT) .................. 102016000131985

(51) Int. Cl.
*B60T 13/00* (2006.01)
*B60T 8/17* (2006.01)
(Continued)

(52) U.S. Cl.
CPC .............. *B60T 8/17* (2013.01); *B60T 13/741* (2013.01); *B60T 13/745* (2013.01);
(Continued)

(58) Field of Classification Search
CPC . B60T 8/17; B60T 8/171; B60T 8/172; B60T 13/74; B60T 13/741; B60T 13/745; B60T 13/746; F16D 55/226; F16D 65/183
See application file for complete search history.

(56) References Cited

U.S. PATENT DOCUMENTS 6,209,689 B1    4/2001  Böhm
6,662,906 B1    12/2003 Bohm et al.
(Continued)

FOREIGN PATENT DOCUMENTS

CN    102529932 A    7/2012
DE    19536694 A1    4/1997
(Continued)

OTHER PUBLICATIONS

The State Intellectual Property Office of People's Republic of China, Office Action in Application No. 201780081642.0, 13 pages.
(Continued)

Primary Examiner — Nicholas J Lane
(74) Attorney, Agent, or Firm — Marshall & Melhorn, LLC

(57) ABSTRACT

A method for controlling the braking action applicable by a brake caliper on a mechanical movement member of a vehicle is described. An electronic control unit operatively connected to an actuator assembly receives an input signal representative of a braking request. The unit determines a first reference value of a position of a component in the actuator assembly and a second reference value of a parameter representative of the braking action applicable by a brake caliper via the actuator assembly. The unit determines at least one feedback value of the position of a component in the actuator assembly. The unit also generates at least one control signal for the actuator assembly based on feedback values and the reference values.

10 Claims, 6 Drawing Sheets

(51) Int. Cl.
  *B60T 13/74* (2006.01)
  *F16D 55/226* (2006.01)
  *F16D 65/18* (2006.01)
  *F16D 121/24* (2012.01)
(52) U.S. Cl.
  CPC .......... *B60T 13/746* (2013.01); *F16D 55/226* (2013.01); *F16D 65/183* (2013.01); *B60T 2270/82* (2013.01); *F16D 2121/24* (2013.01)

(56) References Cited

U.S. PATENT DOCUMENTS

| | | | |
|---|---|---|---|
| 9,506,826 B2 | 11/2016 | Singh et al. | |
| 2005/0269872 A1* | 12/2005 | Ralea | B60T 8/00 188/1.11 R |
| 2007/0235267 A1 | 10/2007 | Liebert | |
| 2008/0121469 A1* | 5/2008 | Maron | B60T 13/741 188/1.11 E |
| 2010/0078519 A1 | 4/2010 | Cahill | |
| 2013/0090827 A1* | 4/2013 | Stan | B60T 8/17 701/70 |
| 2016/0001752 A1* | 1/2016 | Yasui | B60T 8/172 701/70 |
| 2016/0031427 A1* | 2/2016 | Yasui | B60T 17/22 701/70 |
| 2017/0001610 A1* | 1/2017 | Singh | B64C 25/44 |
| 2017/0234380 A1* | 8/2017 | Yasui | F16D 63/006 188/72.1 |

FOREIGN PATENT DOCUMENTS

| | | |
|---|---|---|
| DE | 19730094 A1 | 1/1999 |
| EP | 1695887 A1 | 8/2006 |
| EP | 3032234 A1 | 6/2016 |
| GB | 2463758 A | 3/2010 |

OTHER PUBLICATIONS

European Patent Office, International Search Report and Written Opinion in Application No. PCT/IB2017/058432, dated Mar. 28, 2018, 11 pages, Rijswijk, Netherlands.

* cited by examiner

METHOD FOR CONTROLLING A BRAKING ACTION APPLICABLE BY A BRAKE CALIPER ON A MECHANICAL MOVEMENT MEMBER OF A VEHICLE AND SYSTEM THEREOF

FIELD OF THE INVENTION

The present invention relates to braking techniques of a vehicle and in particular to a method for controlling a braking action applicable by a brake caliper on a mechanical movement member of a vehicle and to a control system thereof.

BACKGROUND

For the purposes of the present invention, vehicle means a car, a motorcycle, a light commercial vehicle, a heavy industrial vehicle or any other vehicle in which it is necessary to apply a braking action on mechanical movement members (e.g. rotors or aircraft landing gear).

Braking system of the B-b-W (Brake-by-Wire) type have become more widespread over time; in braking systems of this type, the braking action of a brake caliper on a mechanical movement member is obtained by using one or more electro-mechanical or electro-hydraulic actuators.

Such actuators contain one more electric motors, which, by means of a mechanical transmission, actuate a cylinder, which displaces a braking fluid, whereby generating a pressure which actuates, in turn, the brake caliper or by means of the mechanical transmission, act on one or more pistons, and therefore on the brake calipers.

A standard configuration of an electro-mechanical or electro-hydraulic actuator of a B-b-W system comprises a linear mechanical transmission between the electric motor and the cylinder or piston to be moved.

In extreme working conditions, in which the electro-mechanical or electro-hydraulic actuator is required to generate high levels of pressure or of force, the presence of a linear mechanical transmission causes the absorption of a large amount of power by the electro-mechanical or electro-hydraulic actuator.

In order to solve this drawback, in a B-b-W braking system, the linear mechanical transmission may be replaced by a non-linear mechanical transmission, in which the mechanical transmission between the electric motor and the component to be moved (cylinder or piston) consists of one or more mechanical transmissions with variable transmission ratios.

In this manner, the electro-mechanical or electro-hydraulic actuator can maximize performance also in extreme conditions.

It is worth noting that in a B-b-W braking system, one or more electronic components is needed which are configured to run a method for controlling the braking action applicable on a mechanical movement member by the electro-mechanical or electro-hydraulic actuator, by managing the electric power coming from a power source of the vehicle and transferred to the electro-mechanical or electro-hydraulic actuator, possibility in any working condition, even the most extreme.

In light of the above, in the B-b-W braking systems, the need is strongly felt to have available a method for controlling the braking action applicable on a mechanical movement member by means of the electro-mechanical or electro-hydraulic actuator which can take into account also a non-linear behavior in various working points of the actuator itself, if a non-linear mechanical transmission is present between the electric motor and the component to be moved, in order to avoid an incorrect, inaccurate operation of the actuator or even the failure of the actuator itself.

SUMMARY

It is the object of the present invention to devise and make available a method for controlling a braking action applicable by a brake caliper on a mechanical movement member of a vehicle which makes it possible to at least partially avoid the drawback described above with reference to the prior art.

Such object is achieved by a method according to claim 1.

It is a further object of the present invention to provide a system for controlling a braking action applicable by a brake caliper on a mechanical movement member of a vehicle.

BRIEF DESCRIPTION OF THE DRAWINGS

Further features and advantages of the method and system thereof according to the invention will be apparent from the following description of preferred embodiments, given by way of indicative, non-limiting examples, with reference to the accompanying figures, in which.

DETAILED DESCRIPTION

Figure 1:
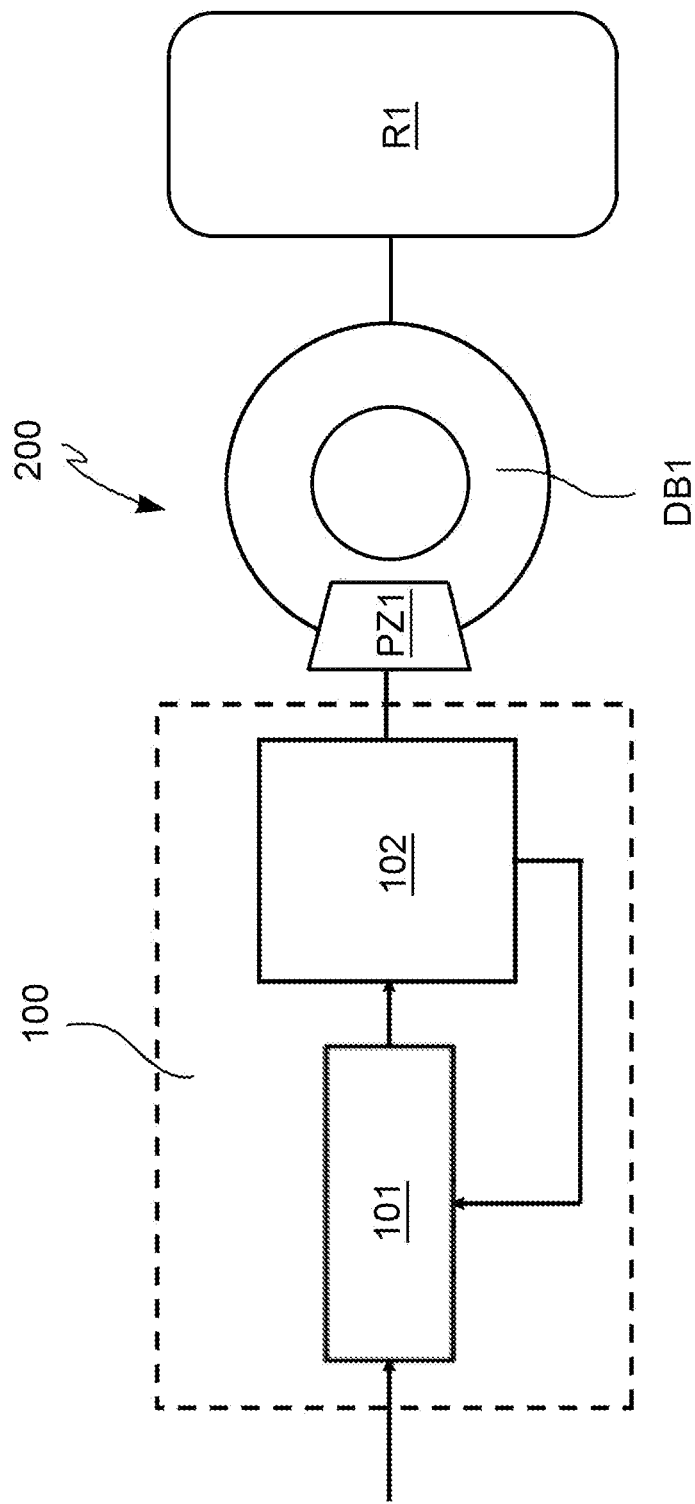
FIG. 1 shows, by means of a block chart, a system for controlling a braking action applicable by a brake caliper on a mechanical movement member of a vehicle, according to an embodiment of the present invention.

A system 100 for controlling a braking action applicable by a brake caliper on a mechanical movement member of a vehicle, hereinafter also control system or simply system, according to the present invention, will firstly be described with reference to the aforesaid figures.

It is worth noting that equal or similar elements in the figures will be indicated by the same reference numerals.

It is worth noting that the vehicle, indicated by reference numeral 200 as a whole, may be, for example, a car, a motorcycle, a light commercial vehicle, a heavy industrial vehicle or any other vehicle in which a braking action must be applied by actuating a brake caliper on mechanical movement members (e.g. rotors or aircraft landing gear).

With reference in particular to FIG. 1, the vehicle 200 comprises at least one mechanical movement member R1 (e.g. a wheel), a first brake disc DB1 operatively associated with said at least one mechanical movement member R1 and a first brake caliper PZ1 which can be actuated to apply on said first brake disc DB1, then on said at least one mechanical movement member R1, a braking action, e.g. a dissipative braking torque.

The vehicle 200 further comprises the system 100 for controlling a braking action applicable by the brake caliper PZ1 on said at least one mechanical movement member R1.

The system 100 further comprises an electronic control unit 101 configured to execute a method for controlling the braking action applicable by a brake caliper PZ1 on a mechanical movement member R1 of a vehicle 100.

Such control method will be described hereinafter according to one or more embodiments according to the present invention, with particular reference to FIGS. 4, 5 and 6.

The electronic control unit 101 may comprise one or more control modules or logics, e.g. microprocessors or microcontrollers, configured to execute the aforesaid control method as a whole.

Turning back to FIG. 1, the system 100 further comprises an actuator assembly 102 of said at least one brake caliper PZ1, operatively connected to the electronic control unit 101.

It is worth noting that the system 100, according to a further embodiment (not shown in FIG. 1), may comprise a further actuator assembly, entirely similar to the actuator assembly 102, of at least one second brake caliper (not shown in the figures), operatively connected to the electronic control unit 101.

Indeed, the vehicle 200 may comprise at least one further mechanical movement member (e.g. a further wheel, not shown in FIG. 1), a further brake disc (not shown in the FIG. 1) operatively associated with said at least one mechanical movement member and the further first brake caliper which can be actuated to apply a braking action, e.g. a dissipative braking torque on said further brake disc, thus on said at least one further mechanical movement member R1.

The at least one mechanical movement member R1 and the at least one further mechanical movement member may belong to the same axis of the vehicle 200, e.g. the front axle or the rear axle.

In such case, the respective actuator assemblies (the at least one actuator assembly 102 and the further actuator assembly, respectively) are operatively connected to and controlled by the electronic control unit 101 itself.

In general, the system 100 may comprise a further actuator assembly, entirely similar to the actuator assembly 102, for each brake caliper with which the vehicle 200 may be provided.

Each brake caliper is operatively associated with a respective brake disc, on which to apply the braking action, operatively associated with a respective mechanical movement member, in turn.

As previously mentioned, the actuator assemblies operatively connected to mechanical movement members belonging to the same vehicle axle (front or rear) are preferably controlled by the same electronic control unit.

Figure 2:
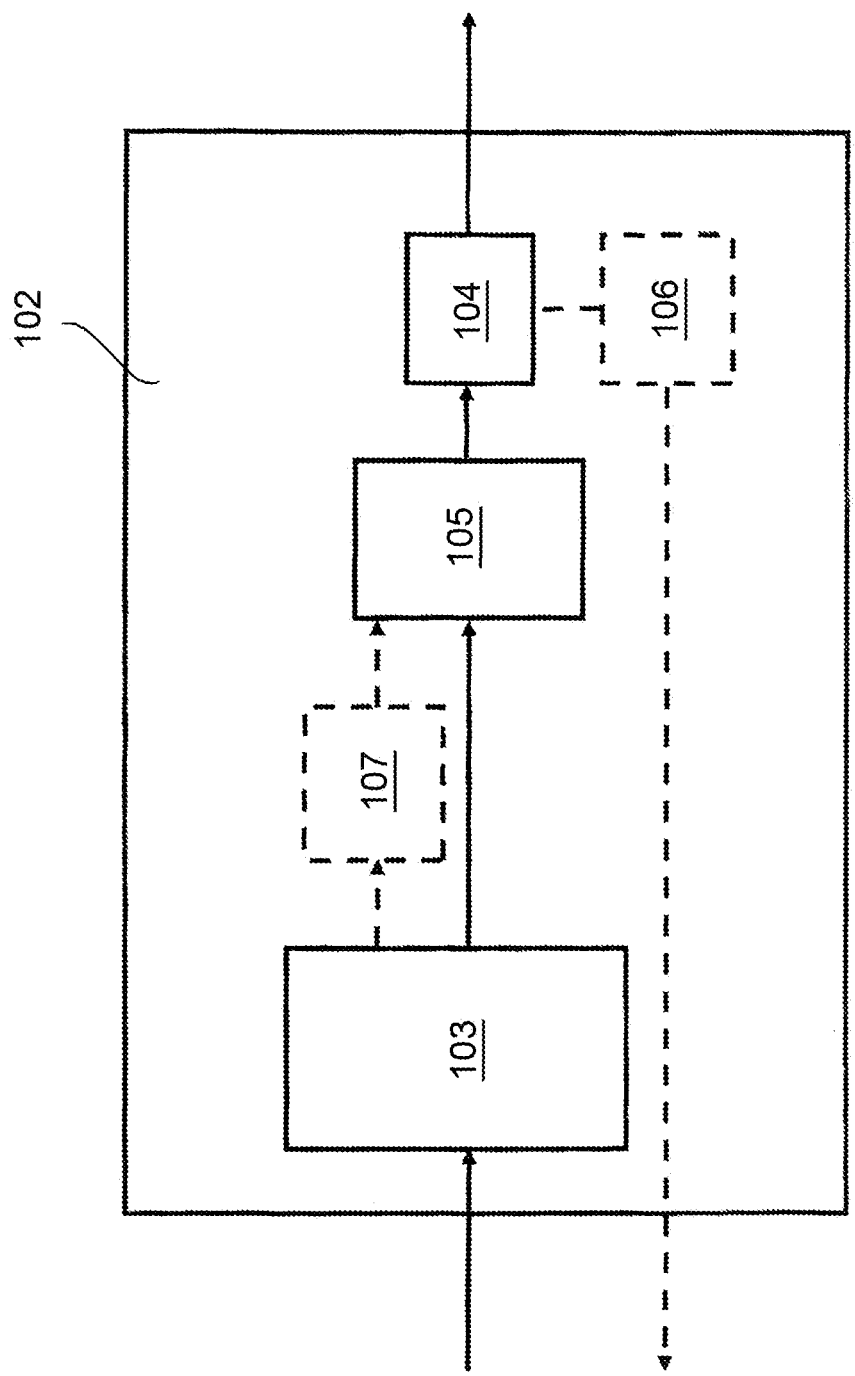
FIG. 2 shows, by means of a block chart, a component of the system shown in FIG. 1, according to an embodiment of the invention.
Figure 3:
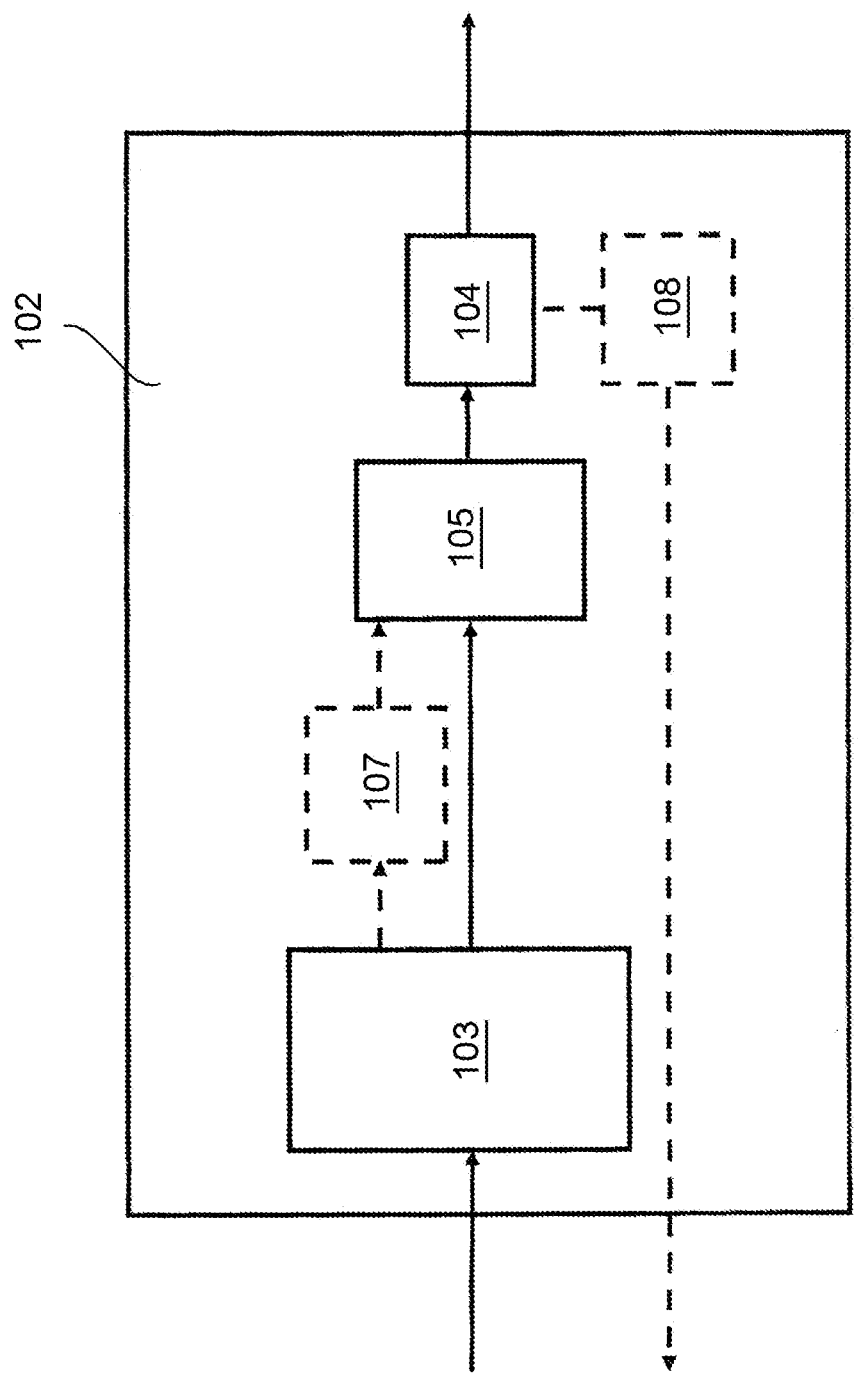
FIG. 3 shows, by means of a block chart, a component of the system shown in FIG. 1, according to an embodiment of the invention.

Turning back to the embodiment in FIG. 1 and now making reference also the embodiments in FIGS. 2 and 3, the actuator assembly 102 comprises at least one electric motor 103 and an actuator 104.

The electric motor 103 is operatively connected to the electronic control unit 101 (not shown in FIGS. 2 and 3) to receive a respective control signal from it.

The electric motor 103 is operatively connected to the actuator 104 by means of a transmission mechanism 105.

According to an embodiment, said transmission mechanism 105 is of non-linear type.

"Transmission mechanism of non-linear type" means the set of one or more mechanisms having variable transmission ratio.

An example of transmission mechanism of non-linear type is a rod-crack type mechanism.

In a transmission mechanism of non-linear type, the translation speed of a translatable portion (e.g. the rod) is a non-linear function of the angular position of a rotatable portion (e.g. the crank) and also of the stroke of the translatable portion.

The pressure of a fluid inside the braking system is approximately a linear function of the stroke of a piston (actuatable by the translatable portion of the non-linear transmission mechanism connected to the actuator 104) and the combination of such linear function with the non-linear function of the translation speed of the piston makes it possible to obtain a non-linear ratio between the torque of the electric motor 103 and the stroke of the piston, in which, in a prevalent portion of the rear stretch (in the first half) of the stroke of the piston, the torque of the electric motor 103 increases in approximately proportional (linear) manner with the advancement of the piston and, on the front stretch (in the second half) of the stroke of the piston, the torque of the electric motor 103 increases in sub-proportional (or decreasing) manner or decreases with the advancement of the piston.

So, a transmission mechanism of non-linear type makes it possible to advantageously obtain an optimal operation of the electric motor 103 and an accurate control of the fluid pressure in normal braking conditions (with the piston in the rear stretch of the stroke of the piston) and a very high pressurization of the fluid in exceptional braking conditions (with the piston in the front stretch of the stroke of the piston).

According to a further embodiment, alternative to the one above, the transmission mechanism may be of linear type.

"Transmission mechanism of linear type" means the set of one or more mechanisms having fixed transmission ratio, e.g. a N:1 reduction ratio.

An example of transmission mechanism of linear type is a cascade or planetary gear mechanism or a screw-nut screw mechanism.

Turning back in general with FIGS. 1, 2 and 3, the electric motor 103 is configured to actuate the actuator 104 by means of the transmission mechanism 105.

In an embodiment, shown in FIG. 2, the actuator assembly 102 is of the electro-hydraulic type.

In this embodiment, the actuator 104 comprises one or more hydraulic cylinders.

The actuation by the electric motor 103 of said one or more hydraulic cylinders generates inside the braking system the hydraulic pressure needed to move the brake caliper PZ1 in order to apply the braking action on the first brake disc D1, and thus on said at least one mechanical movement member R1.

In this embodiment, the system 100 further comprises one or more sensors for detecting a parameter representative of a braking action applicable by the brake caliper PZ1 by means of the actuator assembly 102.

It is worth noting that for the purposes of the present description, "parameter representative of a braking action applicable by the brake caliper by means of the actuator assembly" means any physical quantity from which information representative of a braking action can be obtained, such as for example the force, the position, the pressure, the braking torque, the braking force on the ground, or any other combination thereof.

So, said one or more sensors for detecting a parameter representative of the braking action applicable by the brake caliper PZ1 by means of the actuator assembly 102 may be a force sensor, a pressure sensor, a position sensor, a braking torque sensor and so on.

Said one or more sensors for detecting a parameter representative of the braking action applicable by the brake caliper PZ1 by means of the actuator assembly 102 are configured to provide a value of said at least one parameter detected in the system 100 to the electronic control unit 101.

In an embodiment, shown by a broken line in FIG. 2, said one or more sensors for detecting a parameter representative of the braking action applicable by the brake caliper PZ1 by means of the actuator assembly 102, indicated by reference numeral 106, are inside the actuator assembly 102.

In particular, according to an embodiment, said one or more sensors for detecting a parameter representative of the braking action applicable by the brake caliper PZ1 by means of the actuator assembly 102 are pressure sensors 106, operatively associated with one or more hydraulic cylinders of the actuator 104.

Each pressure sensor 106 is configured to provide a pressure value to the electronic control unit detected inside the respective hydraulic cylinder.

According to a further embodiment, not shown in the figures, said one or more sensors for detecting a parameter representative of the braking action applicable by the brake caliper PZ1 by means of the actuator assembly 102 are operatively associated with the first brake caliper PZ1.

According to a further embodiment, not shown in the figures, either alternatively or in combination with the one above, said one or more sensors for detecting a parameter representative of the braking action applicable by the brake caliper PZ1 by means of the actuator assembly 102 are operatively associated with the first brake disc DB1.

According to a further embodiment, not shown in the figures, either alternatively or in combination with the ones above, said one or more sensors for detecting a parameter representative of the braking action applicable by the brake caliper PZ1 by means of the actuator assembly 102 are operatively associated with at least one mechanical movement member R1.

In an embodiment, either alternatively or in combination with the ones above, the system 100 further comprises one or more sensors (not shown in the figures) for detecting the position of a component in the actuator assembly 102.

In a further embodiment, also shown by broken lines in FIG. 2, the electric motor 103 may be operatively connected to the actuator 104 also by means of a further transmission mechanism 107 of linear type.

It is worth repeating that "transmission mechanism of linear type" means the set of one or more mechanisms having fixed transmission ratio, e.g. a N:1 reduction ratio.

Examples of transmission mechanism of linear type are a cascade or planetary gear mechanism or a screw-nut screw type mechanism.

It is worth noting that the further transmission mechanism 107 is arranged in series with respect to the transmission mechanism 105 between the electric motor 103 and the transmission mechanism 105.

It is worth noting that also if the transmission mechanism 105 is of linear type, the further linear type transmission mechanism 107 may be, for example, a cascade or planetary gear mechanism, while the transmission mechanism 105 may be a screw-nut screw type mechanism.

With reference now to the embodiment shown in FIG. 3, alternative to the one shown with reference to FIG. 2, the actuator assembly 102 is of electro-mechanical type.

In this embodiment, the actuator 104 comprises a piston mechanically connected to the brake caliper PZ1 (not shown in FIG. 2).

The actuation of the piston by the electric motor 103 makes is possible to move the brake caliper PZ1 in order to apply the braking action of the first brake disc D1, and thus on said at least one first mechanical movement member R1.

In this embodiment, the system 100 further comprises one or more sensors for detecting a parameter representative of a braking action applicable by the brake caliper PZ1 by means of the actuator assembly 102.

It is worth noting that for the purposes of the present description, "parameter representative of the braking action applicable by the brake caliper by means of the actuator assembly" means any physical quantity from which information representative of a braking action can be obtained, such as for example the force, the position, the pressure, the braking torque, the braking force on the ground, i.e. the force between the mechanical movement member and the surface on which the vehicle moves, or any other combination thereof.

So, said one or more sensors for detecting a parameter representative of the braking action applicable by the brake caliper PZ1 by means of the actuator assembly 102 could be a force sensor, a pressure sensor, a position sensor, a braking torque sensor, and so on.

Said one or more sensors for detecting a parameter representative of the braking action applicable by the brake caliper PZ1 by means of the actuator assembly 102 are configured to provide a value of said at least one parameter detected in the system 100 to the electronic control unit 101.

In an embodiment, shown by a broken line in FIG. 3, said one or more sensors for detecting a parameter representative of the braking action applicable by the brake caliper PZ1 by means of the actuator assembly 102, indicated by reference numeral 108, are inside the actuator assembly 102.

In particular, according to an embodiment, said one or more sensors for detecting a parameter representative of the braking action applicable by the brake caliper PZ1 by means of the actuator assembly 102 are force sensors and/or torque sensors 108 operatively associated with the piston 104 (actuator of the first brake caliper PZ1).

Each force sensor and/or torque sensor 108 is configured to provide a force and/or torque value detected in the piston 104 to the electronic control unit.

According to a further embodiment, not shown in the figures, said one or more sensors for detecting a parameter representative of the braking action applicable by the brake caliper PZ1 by means of the actuator assembly 102 are operatively associated with the first brake caliper PZ1.

According to a further embodiment, not shown in the figures, either alternatively or in combination with the one above, said one or more sensors for detecting a parameter representative of the braking action applicable by the brake caliper PZ1 by means of the actuator assembly 102 are operatively associated with the first brake disc DB1.

According to a further embodiment, not shown in the figures, either alternatively or in combination with the ones above, said one or more sensors for detecting parameter representative of the braking action applicable by the brake caliper PZ1 by means of the actuator assembly 102 are operatively associated with at least one mechanical movement member R1.

In a further embodiment, also shown with broken lines in FIG. 3, the electric motor 103 may be operatively connected to the actuator 104 also by means of a transmission mechanism of linear type 107 (fixed transmission ratio, e.g. with N:1 reduction ratio).

Examples of transmission mechanism of linear type are a cascade or planetary gear mechanism or a screw-nut screw type mechanism.

It is worth noting that also in this embodiment, the further transmission mechanism 107 is arranged in series with respect to the transmission mechanism 105 between the electric motor 103 and the transmission mechanism 105.

It is worth noting that also if the transmission mechanism 105 is of linear type, the further linear type transmission mechanism 107 may be, for example, a cascade or planetary gear mechanism, while the transmission mechanism 105 may be a screw-nut screw type mechanism.

Figure 4:
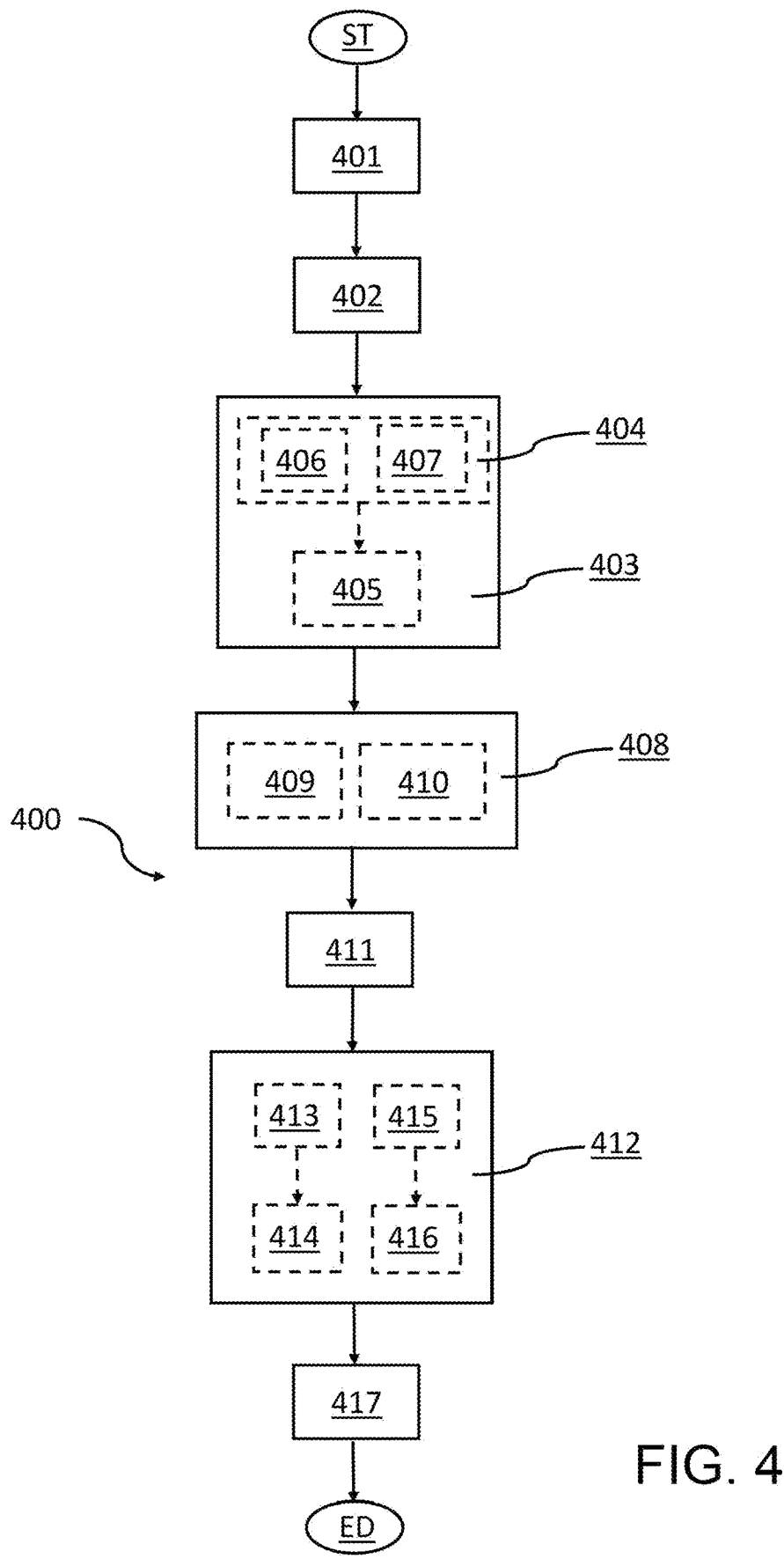
FIG. 4 shows, by means of a block diagram, a method for controlling a braking action applicable by a brake caliper on a mechanical movement member of a vehicle, according to an embodiment of the present invention.
Figure 5:
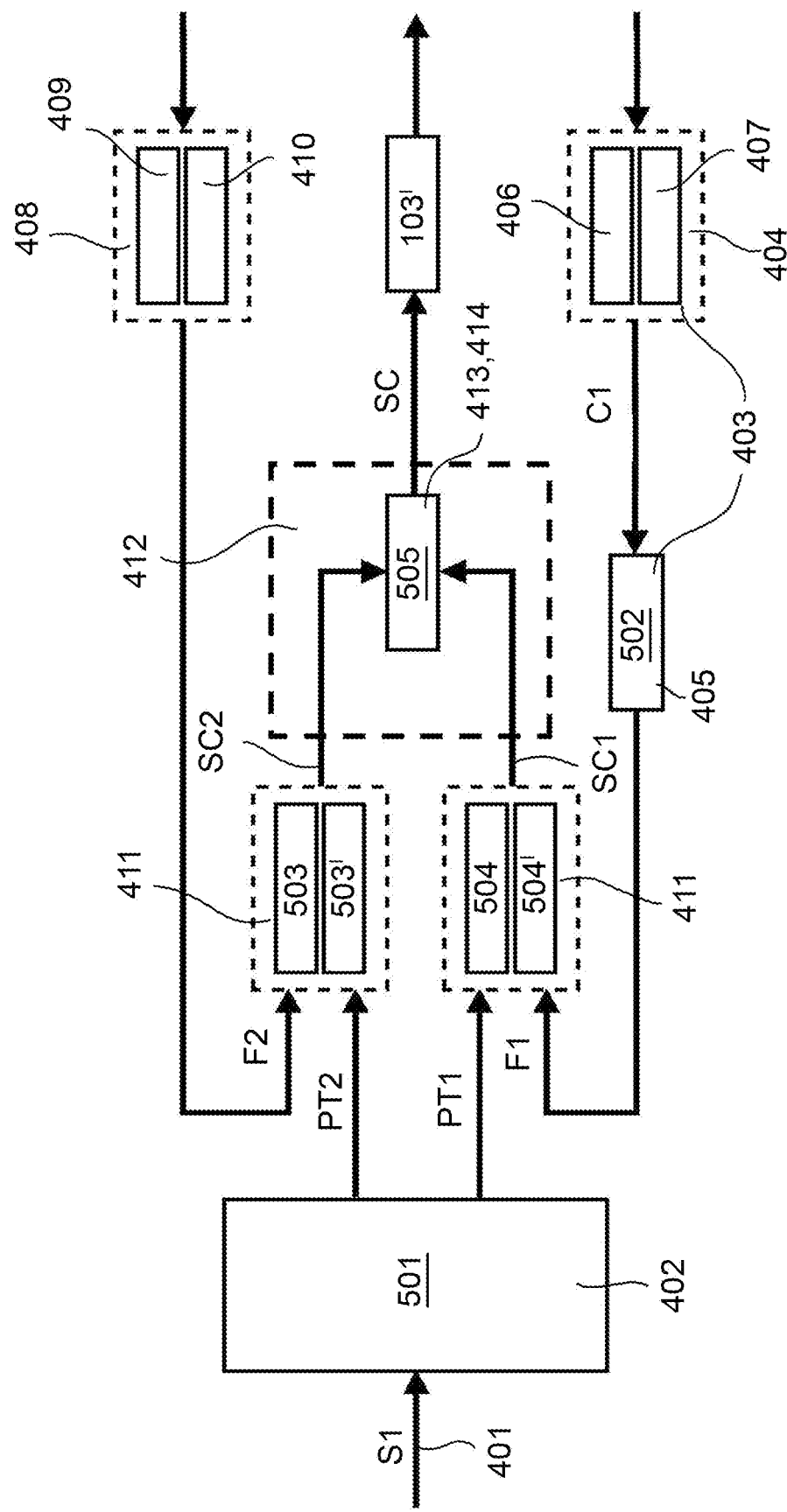
FIG. 5 shows, by means of a functional block chart, a method for controlling a braking action applicable by a brake caliper on a mechanical movement member of a vehicle, according to an embodiment.
Figure 6:
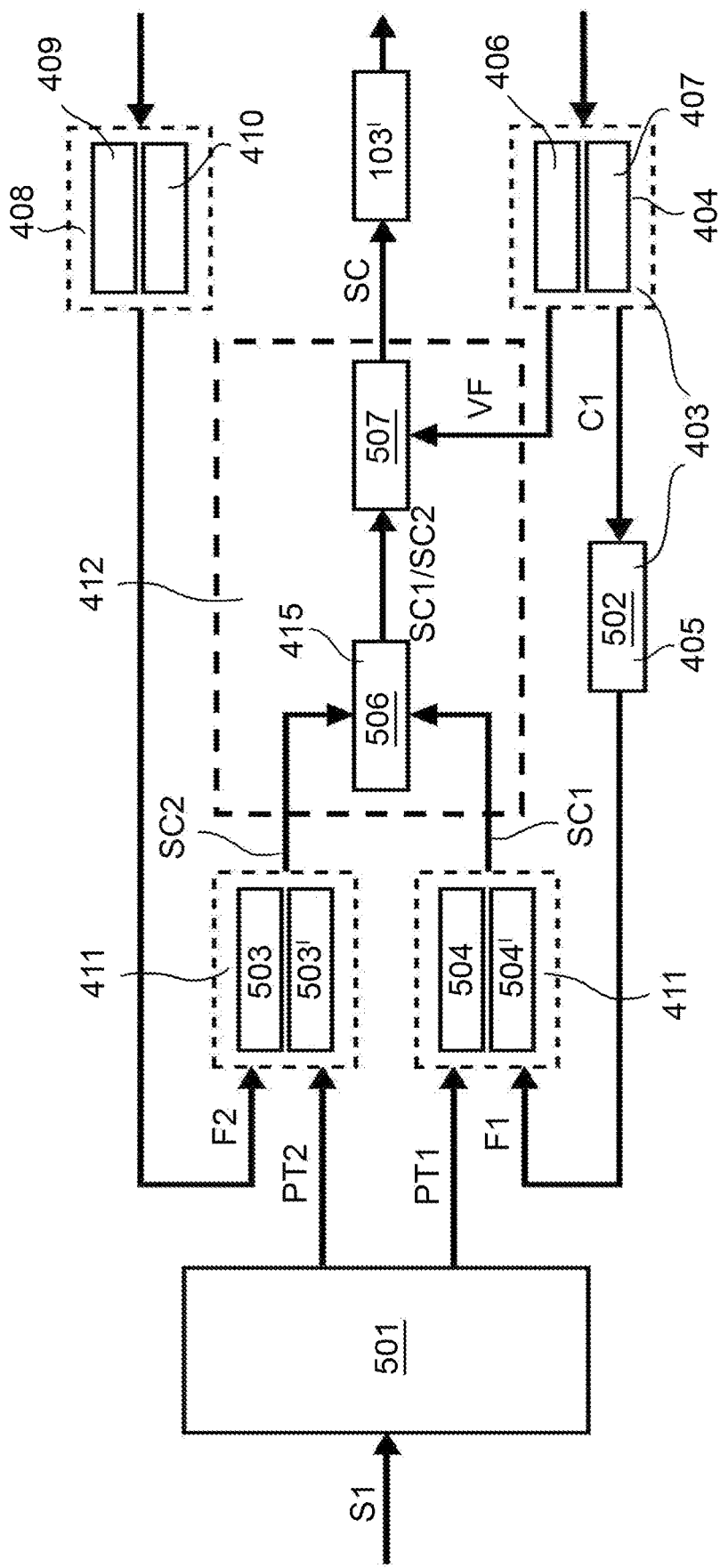
FIG. 6 shows, by means of a functional block chart, a method for controlling a braking action applicable by a brake caliper on a mechanical movement member of a vehicle, according to a further embodiment.

With reference also to FIGS. 4, 5 and 6, a method 400 for controlling the braking action applicable by a brake caliper on a mechanical movement member of a vehicle is described, hereinafter control method or simply method.

As previously mentioned with reference to any one of the embodiments described above, the actuator assembly 102 comprises at least one electric motor 103 and an actuator 104 of the brake caliper PZ1.

The electric motor 103 is operatively connected to the actuator 104 by means of a transmission mechanism 105.

The electric motor 103 is configured to actuate the actuator 104 by means of the transmission mechanism 105.

Turning back to FIG. 4, the method 400 comprises a symbolic step of starting ST.

The method 400 further comprises a step of receiving 401, by an electronic control unit 101 operatively connected to the actuator assembly 102, an input signal 51 representative of a braking request (also see FIGS. 5 and 6).

In an embodiment, the braking request may be imparted by the driver of the vehicle by means of a brake pedal.

According to a further embodiment, alternative to the one above, in the case of self-driving, emergency braking, anti-collision, the braking request may be provided automatically by the vehicle 200 without any intervention by the driver of the vehicle 200.

In particular, the braking request may be provided by a further electronic control unit, a further control logic, a further hardware circuit, one or more sensors, and so on.

Turning back to FIG. 3, the method 400 further comprises a step of determining 402, by the electronic control unit 101, on the basis of the received input signal:

a first reference value PT1 of a position of a component in the actuator assembly 102;

a second reference value PT2 of a parameter representative of the braking action applicable by the brake caliper PZ1 by means of the actuator assembly 102.

It is worth noting that the component in the actuator assembly 102 may the actuator 104, i.e. one or more hydraulic cylinders if the actuator assembly is of the electro-hydraulic type, or a piston if the actuator assembly is of the electro-mechanical type, the electric motor 103, one or more mechanical elements of transmission mechanism of linear type or of non-linear type.

It is worth noting that for the purposes of the present description, "parameter representative of the braking action applicable by the brake caliper PZ1 by means of the actuator assembly" means any physical quantity from which information representative of a braking action can be obtained, such as, for example, the force, the position, the pressure, the braking torque, the braking force on the ground, i.e. the force between the mechanical movement member and the surface on which the vehicle moves, or any other combination thereof.

It is worth noting that step of determining 402 may be performed by an internal reference generation logic, indicated by 501 in FIGS. 5 and 6, belonging to the electronic control unit 101.

The method 400 further comprises a step of determining 403, by the electronic control unit 101, a first feedback value F1 of the position of a component in the actuator assembly 102.

The step of determining 403 the first feedback value F1 of the position of a component in the actuator assembly 102 comprises the steps of:

determining 404, by the electronic control unit 101, a first current value C1 of the position of a component of the actuator assembly 102;

compensating 405, by the electronic control unit 101, the effect of the transmission mechanism 105 present in the actuator assembly 102 on the determined first current value C1 of the position of a component of the actuator assembly 102.

According to an example, the transmission mechanism 105 may be of non-linear type, e.g. a rod-crank mechanism, the advantages of which were described above.

In this case, the first reference value PT1 of a position of a component inside the actuator assembly 102 may be referred to the position of a component downstream of the transmission mechanism 105 (e.g. the rod-crank type mechanism), e.g. the position of the piston 104, if the actuator assembly 102 is of the electro-mechanical type.

The first current value C1 of a position of a component of the actuator assembly 102 may be instead referred to the position of a component upstream of the transmission mechanism 105 (e.g. the rod-crank type mechanism), e.g. the position of the electric motor 103.

If the transmission mechanism 105 is of non-linear type, and in particular is a rod-crank type mechanism, by combining appropriate mathematical ratios it is possible to determine the position X of the downstream component of the rod-crank mechanism (piston 104) on the basis of the measurement of the inclination angle of the crank, upstream of the rod-crank mechanism, or vice versa.

It is worth noting that the non-linear transmission mechanism also affects the non-constant reduction ratio between the force delivered downstream of the non-linear transmission mechanism and the braking torque generated upstream of the non-linear transmission mechanism.

The compensation of the effect of the transmission mechanism may be performed by a control logic, indicated by reference numeral 502 in FIGS. 5 and 6, belonging to the electronic control unit 101 and makes it possible to provide a first feedback value F1 of the position of a component in the actuator assembly 102 in any working point of the B-b-W (Brake-by-Wire) braking system in which the control system 100, described above, is located.

It is worth noting that the step of compensating 405 makes it possible to make the measured position value and the respective position reference value homogeneous and take both downstream or upstream of the transmission mechanism 105.

According to an embodiment, the step of determining 404 a first current value C1 of the position of a component of the actuator assembly 102 comprises a step of measuring 406, by one or more position detection sensors with which the system 100 is provided, the position of the component in the actuator assembly 102.

In an embodiment, such one or more position detection sensors are arranged inside the actuator assembly 102.

According to a further embodiment, either alternatively or in combination with the one above, the step of determining 404 a first current value C1 of the position of a component of the actuator assembly 102 comprises a step of estimating 407, by the electronic control unit, the position of the component in the actuator assembly 102.

It is worth noting that this can be performed by starting from the measurement of electric current of the electric motor 103, or exploiting the measurement of the electromotive force of the electric motor 103, from which the speed is obtained, and by integrating the position, or by exploiting a dynamic model of the actuator assembly 102 from which the position of the component is obtained as output, given the same controls in electric voltage/electric current to the actuator 104 as inputs.

Turning back to the embodiment in FIG. 4, the method 400 further comprises a step of determining 408, by the electronic control unit 101, a second feedback value F2 of the parameter representative of the braking action applicable by the brake caliper PZ1 by means of the actuator assembly 102.

In an embodiment, the step of determining 408 the second feedback value F2 of the parameter representative of the braking action applicable by the brake caliper PZ1 by means of the actuator assembly 102 comprises a step of measuring 409, by means of one or more sensors with which the system 100 is provided, the parameter representative of the braking action applicable by the brake caliper PZ1 by means of the actuator assembly 102.

Examples of type and arrangement in the system 100 of said one or more sensors were described above with reference to the description of the different embodiments of the system 100.

According to a further embodiment, either alternatively or in combination with the one above, the step of determining 408 the second feedback value F2 of the parameter representative of the braking action applicable by the brake caliper PZ1 by means of the actuator assembly 102 comprises a step of estimating 410, by the electronic control unit 101, the parameter representative of the braking action applicable by the brake caliper PZ1 by means of the actuator assembly 102.

The estimate may be performed, for example:

starting from the electric current of the electric motor 103 and, by means of a dynamic model of the actuator 104, by calculating the braking torque of the electric motor 103, and thus the braking force;

starting from the deceleration of the vehicle 200 and the slip of said at least one mechanical movement member (wheel), and by means of the model of the vehicle 200, tracing back to the braking force on the ground, and thus to the braking torque and finally to the braking force;

using the position measurement and based on the position-nominal force relationship, with the due compensations related to temperature, aging, wear and so on.

Turning back to the embodiment in FIG. 3, the method 400 further comprises a step of generating 411, by the electronic control unit 101:

a first intermediate control signal SC1 of the actuator assembly 102 on the basis of the comparison between the first feedback value F1 of the position of a component in the actuator assembly 102 and the first reference value PT1 of the position of a component in the actuator assembly 102;

a second intermediate control signal SC2 of the actuator assembly 102 on the basis of the comparison of the second feedback value F2 of the parameter representative of the braking action applicable by the brake caliper PZ1 by means of the actuator assembly 102 and the second reference value PT2 of the parameter representative of the braking action applicable by the brake caliper PZ1 by means of the actuator assembly 102.

It is worth noting that step of generating the first intermediate control value SC1 of the actuator assembly 102 and the second intermediate control value SC2 of the actuator assembly 102 is performed by respective control logics, indicated respectively by the reference numerals 503, 503' for the first intermediate control signal SC1 and with the reference numerals 504, 504' for the second intermediate control signal SC2, belonging to the electronic control unit 101.

It is worth noting that the step of generating the first intermediate control value SC1 of the actuator assembly 102 is possible by virtue of the step of compensating, which makes it possible to make the measured position value and the respective position reference value homogeneous and take both downstream or upstream of the transmission mechanism 105.

The method 400 further comprises a step of generating 412, by the electronic control unit 101, a control signal SC of the actuator assembly 102 on the basis of the first intermediate control signal SC1 of the actuator assembly 102 and of the second intermediate control signal SC2 of the actuator assembly 102.

In an embodiment with a single control loop, shown in FIG. 5, the first intermediate control signal SC1 and the second intermediate control signal SC2 are a first error signal SC1 and a second error signal SC2, respectively.

The first error signal SC1 can be obtained instant-by-instant by subtracting the first reference value PT1 of the position of a component in the actuator assembly 102 from the first feedback value F1 of the position of a component in the actuator assembly 102 (SC1=F1−PT1).

The second intermediate control signal SC2 can be obtained instant-by-instant by subtracting the second reference value PT2 of the parameter representative of the braking action applicable by the brake caliper PZ1 by means of the actuator assembly 102 from the second feedback value F2 of the parameter representative of the braking action applicable by the brake caliper PZ1 by means of the actuator assembly 102 (SC2=F2−PT2).

The step of generating 412 comprises the steps of:

selecting 413, by the electronic control unit 101, one of or a combination of said first error signal SC1 and said second error signal CS2;

determining 414, by the electronic control unit 101, the control signal SC of the actuator assembly 102 on the basis of said one of the first error signal SC1 and the second error signal SC2;

It is worth noting that control signal SC of the actuator assembly 102 is the output of a controller (indicated by reference numeral 505 in FIG. 5 and by reference numeral 507 in FIG. 6), which may be a PI or PID controller or an optimal control, for example.

The step of selecting 413 is based on multiple conditions and depends on various signals which may be either present or not, such as: the value of the input signal 51, derivate of the input signal 51, measured force, measured position, force reference, position reference, time elapsed since the beginning of the braking request, output signal level (output from block 103' in FIGS. 5 and 6), internal system state.

The selection may be a simple passage of the first error signal SC1 to the second error signal SC2 and vice versa, and may be instantaneous (either said first error or said second error signal is used in one step and the other one is used in the successive step), or may be a linear combination between the first error signal SC1 and the second error signal SC2 to make a gradual/smooth passage in several steps, according to the following formula:

$$SC=\beta*SC1+(1-\beta)*SC2$$

wherein where β may be a number between 0 and 1 decided according to the conditions indicated above.

It is worth noting that the step of generating 412, in the embodiment in FIG. 5, is performed by a control or arbitration logic, indicated by reference numeral 505, belonging to the electronic control unit.

In an embodiment with multiple control loops, shown in FIG. 6, the first intermediate control signal SC1 and the second intermediate control signal SC2 are respectively a first speed value SC1 and a second speed value SC2 coming from the control of the parameter representative of the braking action of the actuator assembly 102 and the control of the position of the component in the actuator assembly 102.

In greater detail, in the embodiment of FIG. 6, a controller 504 (P or PI), adapted to generate a speed reference value, is used in the step of calculating the first error signal SC1 (SC1=FI−PTI).

Furthermore, a feed-forward component 504' may be optionally used, in parallel to the controller 504, which generates a speed reference signal which is added to the output of the regulator 504 by using the first reference value PT1 only as input.

In entirely similar manner, in the embodiment in FIG. 6, a further controller 503 (P or PI), adapted to generate a further speed reference value, is used in the step of calculating the second error signal SC2 (SC2=FI−PTI).

Furthermore, a further feed-forward component 503' may be optionally used, in parallel to the further controller 503, which generates a further speed reference signal which is added to the output of the regulator 503 by using the second reference value PT2 as input only.

It is worth noting that the controller 504, the feed-forward component 504', the further regulator 503 and the further feed-forward component 504' are part of the electronic control unit 101.

Turning back to the embodiment in FIG. 4, the step of generating 412 comprises the steps of:

selecting 415, by the electronic control unit 101, either one or a combination of said first speed value SC1 and said second speed value CS2;

determining 416, by the electronic control unit 101, the control signal SC of the actuator assembly 102 on the basis of the comparison between said one of said first speed value SC1 and the second speed value SC2 and a speed feedback value VF of the electric motor 103 of the actuator assembly 102.

The speed feedback value VF may be determined starting from the position of the electric motor 103, or by means of a speed sensor positioned on the electric motor 103, or by a speed estimator, also belonging to the electronic control unit 101.

It is worth noting that the step of selecting 415 occurs according to a complex logic entirely similar to that described above with reference to the step of selecting 213.

Furthermore, in greater detail, it is worth noting that in the step of determining 416 the error is calculated between the reference signal output from the step of selecting 415 and successively, by using a further PI or PID controller, the control signal SC is generated.

It is worth noting that the step of generating 412, in the embodiment in FIG. 5, is performed by a control or arbitration logic, indicated by reference numeral 505, belonging to the electronic control unit.

It is worth noting that the step of selecting 415 and the step of determining 416 are performed by respective control logics, indicated by reference numerals 506 and 507, belonging to the electronic control unit 101, respectively.

Turning back to the embodiment in FIG. 4, the method 400 further comprises a step of providing 417 to the electric motor 103 of the actuator assembly 102, by the electronic control unit 101, the generated control signal SC.

With this regard, both in the embodiment shown in FIG. 5 (single control loop) and in the embodiment in FIG. 6 (multiple control loops), the generated control signal SC may be a digital modulation signal of the PWM type, standing for Pulse Width Modulation, an electrical voltage analog signal or an electric current analog signal.

It is worth noting that the control signal SC is provided with a driving module 103' of the electric motor 103.

Turning back to the embodiment in FIG. 4, the method 400 comprises a symbolic step of ending ED.

The method 400 is cyclic so the steps described from step of starting ST to the step of ending ED are run cyclically whenever the method 400 is run.

In a further embodiment, not shown in the figures, either alternatively or in combination with any one of the embodiments described above, the method 400 further comprises a step of adapting, by the electronic control unit 101, control parameters, such as for example the position of the component in the actuator assembly 102 and the parameter representative of the braking action applicable by the brake caliper PZ1 by means of the actuator assembly 102, on the basis of stiffness variations of the brake caliper PZ1.

It is worth noting that the step of adapting may be envisaged in optimization perspective of the control system performance according to the working point of the brake caliper.

In greater detail, the step of adapting comprises the step of identifying, by the electronic control unit 101, starting from a set of reference values of the position of the component in the actuator assembly 102 and of the parameter representative of the braking action applicable by the brake caliper PZ1 by means of the actuator assembly 102, a variation of stiffness of the brake caliper PZ1 by comparing a current stiffness value of the brake caliper PZ1 (determined by means of the use of force sensors positioned at the brake caliper PZ1 or estimated indirectly by other quantities) with a nominal stiffness value of the brake caliper PZ1.

It is worth noting that the control parameters can be modified by the electronic control unit 101 continuously by a quantity obtained as a function of the entity of the variation of the current rigidity curve with respect to the nominal rigidity curve by means of an either linear or non-linear law and may keep in consideration also the non-linearity of the transmission mechanism of non-linear type.

Furthermore, other control parameters may be modified by the electronic control unit in discreet manner when the different thresholds of the current rigidity curve with respect to the nominal rigidity curve are exceeded.

It is worth noting that the updating frequency of the control parameters may be different according to embodiments.

For example, control parameters may be updated by the electronic control unit 101 as a function of the number of key cycles, as a function of the number of braking operations.

Furthermore, the updating may be performed by the electronic control unit 101 according to the time or to the kilometers traveled by the vehicle or as a function of variations of temperature of the intensity of use of the brakes in a set period of time.

It is worth noting that the possible variations of the control system 100 include the wear of the pads on which the brake caliper PZ1 acts, which modify the curve representing system rigidity.

With this regard, an estimate of the wear of the brake pad makes it possible to adapt the respective control parameters so as to always have a system response coherent to the state of the latter.

According to an embodiment, the nominal rigidity of the brake caliper PZ1 may be identified by an initialization procedure of the control system 100 which makes it possible to reconstitute the nominal rigid curve of the brake caliper PZ1 starting from come characteristic points of the system sufficient to cover the entire operative range.

Once the nominal rigidity curve of the brake caliper PZ1 has been identified, the method 400, in an embodiment, may collocate the control system 100 in a family of brake calipers using a predetermined set of reference (default) parameters for control.

It is worth noting that the step of adapting the control parameters described above can be used to adapt the control parameters starting from the selected set of reference (default) control parameters and optimizing them for the brake caliper connected to the control system 100.

In this manner it is possible to advantageously obtain a self-calibration of the control system 100 which makes it possible to maximize performance by adapting the control parameter to the brake caliper type and the rigidity variations of the connecting brake caliper.

The control method 400 and the control system 100 according to the present invention have many advantages.

The method 400, by taking into consideration the variable transmission radio in the various working position, can adapt the control parameters in order to maximize performance, while maintaining a high level of robustness so as to work correctly regardless of the system variations due to temperature, wear, aging and so forth.

The control method 400 may be performed by an electro-hydraulic or electro-mechanical actuator assembly using a Brake-by-Wire braking system, by managing a transmission mechanism of non-linear type so as to provide good performance in all working points of the actuator assembly, adapting to the current conditions of the actuator assembly, whereby compensating wear, aging, temperature and so on, modify the control parameters to optimize the performance of the B-b-W type braking system.

Another important advantage of the method 400 is the possibility of being used both on transmission mechanisms of non-linear type and on transmission mechanisms of linear type.

The control method 400 may be calibrated and configured to obtain optimal results (in case of non-linear type and linear type transmissions) for different applications according to the brake calipers and of the vehicle on which the control method is used.

The control method 400 may be calibrated to be used for each electro-hydraulic or electro-mechanical actuator assembly—brake caliper to have the best response for the overall Brake-by-Wire type braking system.

The linear component of the transmission mechanism can be assessed in the first part of the braking request, while the behavior of the non-linear component of the transmission mechanism may be assessed when the actuator is pushed nearly to its limit or in extreme and particular conditions, such as fading or degraded conditions.

The control method 400 and the system thereof may be used in presence of transmission mechanisms of non-linear type and in the case of transmission mechanisms of linear type, since the linear transmission is a particular case of non-linear transmission.

Furthermore, the method 400 may show an adaptation function of the parameters which make it possible to vary the value of the control parameters in order to optimize performance adapting to variations of the system under control.

A person skilled in art may make changes and adaptations to the method and system thereof described above or can replace elements with others which are functionally equivalent to satisfy contingent needs without departing from the scope of protection of the appended claims. All the features described above as belonging to one possible embodiment may be implemented independently from the other described embodiments.

The invention claimed is:

1. A method for controlling the braking action applicable by a brake caliper on a mechanical movement member of a vehicle, said brake caliper being actuatable by an actuator assembly comprising at least one electric motor and an actuator of the brake caliper, the electric motor being operatively connected to the actuator via a transmission mechanism, the electric motor being configured to operate the actuator via the transmission mechanism, the method comprising steps of:

receiving, by an electronic control unit operatively connected to the actuator assembly, an input signal representative of a braking request;

determining, by the electronic control unit, on the basis of the received input signal:

a first reference value of a position of a component in the actuator assembly;

a second reference value of a parameter representative of the braking action operable by the brake caliper via the actuator assembly;

determining, by the electronic control unit, a first feedback value of the position of a component in the actuator assembly;

determining, by the electronic control unit, a second feedback value of the parameter representative of the braking action applicable by the brake caliper via the actuator assembly;

generating, by the electronic control unit:

a first intermediate control signal of the actuator assembly on the basis of the comparison between the first feedback value of the position of a component in the actuator assembly and the first reference value of the position of a component in the actuator assembly;

a second intermediate control signal of the actuator assembly on the basis of the comparison of the second feedback value of the parameter representative of the braking action applicable by the brake caliper by means of the actuator assembly and the second reference value of the parameter representative of the braking action applicable by the brake caliper via the actuator assembly;

generating, by the electronic control unit, a control signal of the actuator assembly on the basis of the first intermediate control signal of the actuator assembly and of the second intermediate control signal of the actuator assembly;

providing to the electric motor of the actuator assembly, by the electronic control unit, the generated control signal.

2. The method according to claim 1, wherein the step of determining the first feedback value of the position of a component in the actuator assembly comprises the steps of:

determining, by the electronic control unit, a first current value of the position of a component of the actuator assembly;

compensating, by the electronic control unit, the effect of the transmission mechanism present in the actuator assembly on the determined first current value of the position of a component of the actuator assembly.

3. The method according to claim 2, wherein the step of determining a first current value of the position of a component of the actuator assembly comprises a step of measuring, by one or more position detection sensors, the position of the component in the actuator assembly.

4. The method according to claim 3, wherein the step of determining a first current value of the position of a component of the actuator assembly comprises a step of estimating, by the electronic control unit, the position of the component in the actuator assembly.

5. The method according to claim 1, wherein the step of determining the second feedback value of the parameter representative of the braking action applicable by the brake caliper via the actuator assembly comprises a step of measuring, by one or more actuators, the parameter representative of the braking action applicable by the brake caliper via the actuator assembly.

6. The method according to claim 1, wherein the step of determining the second feedback value of the parameter representative of the braking action applicable by the brake caliper via the actuator assembly comprises a step of estimating, by the electronic control unit, the parameter representative of the braking action applicable by the brake caliper by means of the actuator assembly.

7. The method according to claim 1, wherein the first intermediate control signal and the second intermediate control signal are respectively a first error signal and a second error signal, the step of generating comprising the steps of:

selecting, by the electronic control unit, one of or a combination of said first error signal and said second error signal;

determining, by the electronic control unit, the control signal of the actuator assembly on the basis of said one of the first error signal and the second error signal.

8. The method according to claim 1, wherein the first intermediate control signal and the second intermediate control signal are respectively a first speed value and a second speed value coming from the control of the parameter representative of the braking action of the actuator assembly and the control of the position of the component in the actuator assembly, the step of generating comprising the steps of:

selecting, by the electronic control unit, one of or a combination of said first speed value and said second speed value;

determining, by the electronic control unit, the control signal of the actuator assembly on the basis of the comparison between said one of said first speed value and the second speed value and a speed feedback value of the electric motor of the actuator assembly.

9. The method according to claim 1, further comprising a step of adapting, by the electronic control unit, the position of the component in the actuator assembly and the parameter representative of the braking action applicable by the brake caliper via the actuator assembly on the basis of stiffness variations of the brake caliper.

10. The method according to claim 9, wherein the step of adapting comprises a step of identifying, by the electronic control unit, a variation of stiffness of the brake caliper by comparing a current stiffness value of the brake caliper with a nominal stiffness value of the brake caliper, starting from a set of reference values of the position of the component in the actuator assembly and of the parameter representative of the braking action applicable by the brake caliper by means of the actuator assembly.

* * * * *